A. J. OFFORD.
ICE CUTTING MACHINE.
APPLICATION FILED APR. 16, 1908.

935,127.

Patented Sept. 28, 1909.
7 SHEETS—SHEET 1.

Witnesses
James F. Crown
L. D. Little

Inventor
Andrew J. Offord
By Watson E. Coleman
Attorney

A. J. OFFORD.
ICE CUTTING MACHINE.
APPLICATION FILED APR. 16, 1908.

935,127.

Patented Sept. 28, 1909.
7 SHEETS—SHEET 5.

Witnesses
James F. Crown
L. O. Little

Inventor
Andrew J. Offord
By Watson E. Coleman
Attorney

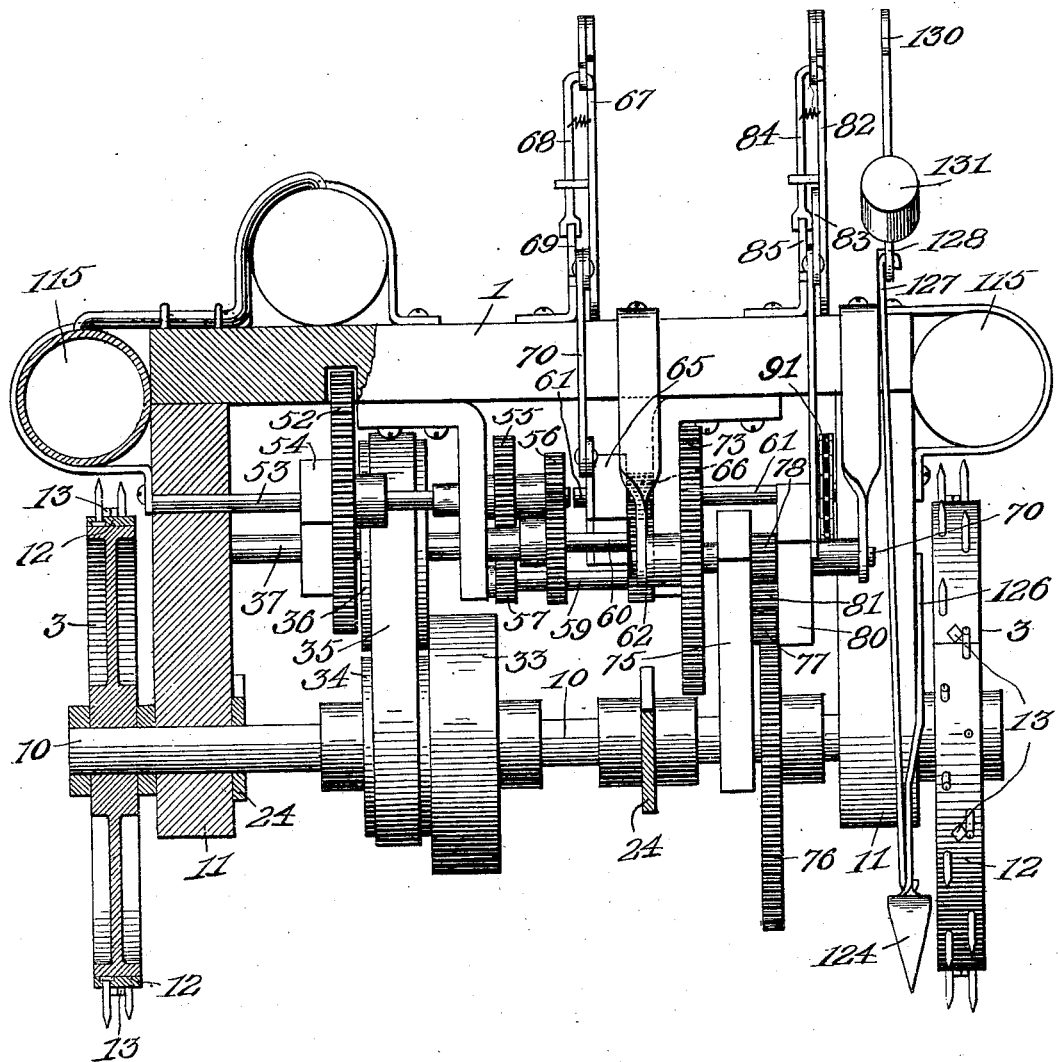

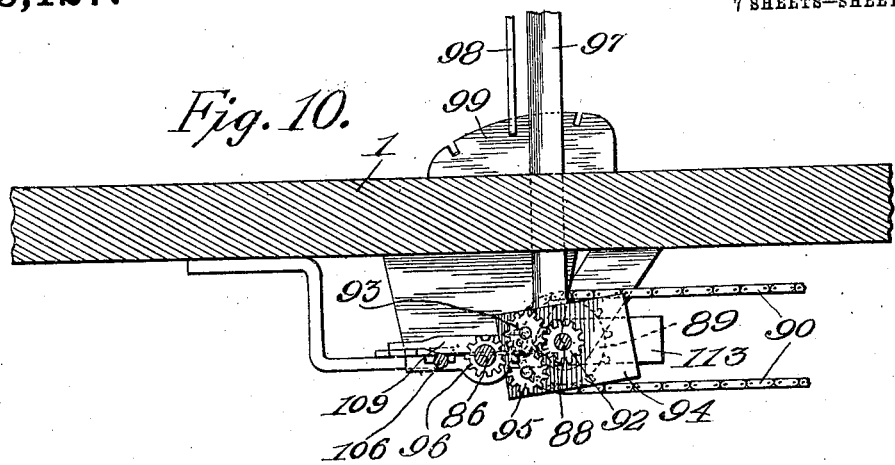
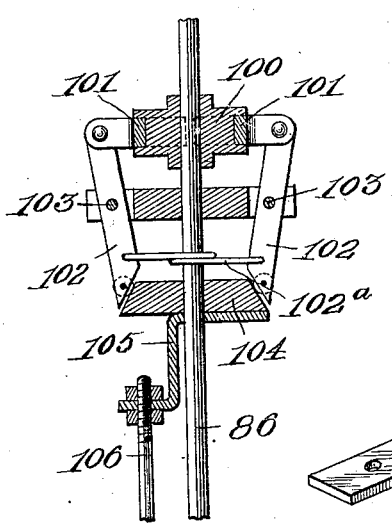
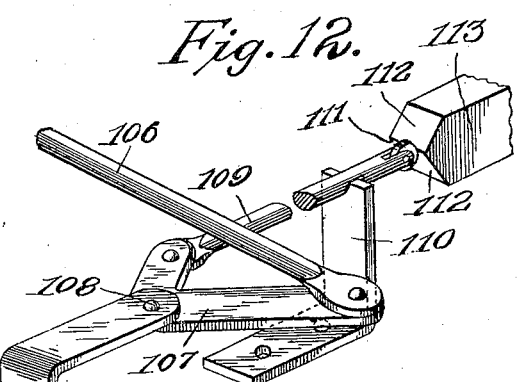

UNITED STATES PATENT OFFICE.

ANDREW J. OFFORD, OF GRAND HAVEN, MICHIGAN.

ICE-CUTTING MACHINE.

935,127.   Specification of Letters Patent.   Patented Sept. 28, 1909.

Application filed April 16, 1908. Serial No. 427,399.

*To all whom it may concern:*

Be it known that I, ANDREW J. OFFORD, a citizen of the United States, residing at Grand Haven, in the county of Ottawa and State of Michigan, have invented certain new and useful Improvements in Ice-Cutting Machines, of which the following is a specification, reference being had to the accompanying drawings.

My invention relates to improvements in machines for cutting and handling ice.

The object of the invention is to provide a self propelled machine of this character having improved means for sawing the ice, hoisting it out of the river, pond or lake and into a suitable storage house or upon vehicles which are to transport it, improved means for controlling the hoisting mechanism, improved means for controlling the propulsion of the machine and an improved marking device.

With the above and other objects in view, the invention consists of the novel features of construction and the combination and arrangement of devices hereinafter fully described and claimed, and illustrated in the accompanying drawings, in which—

Figure 1:
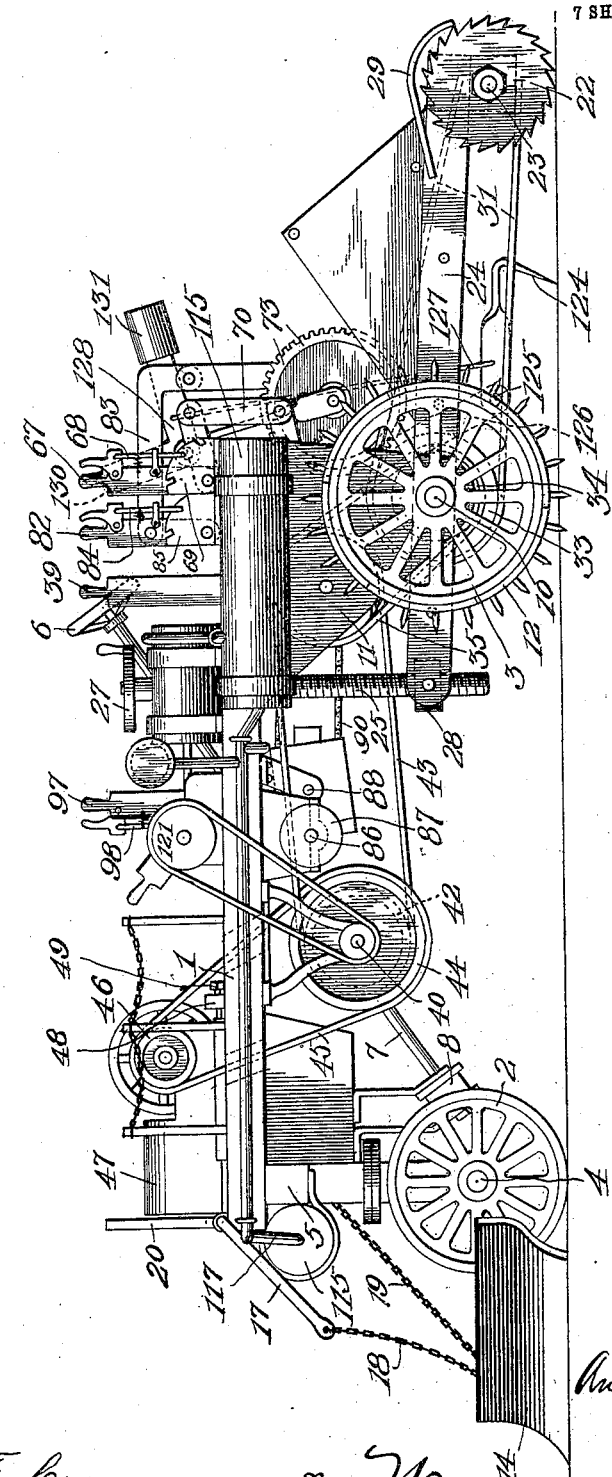
Figure 2:
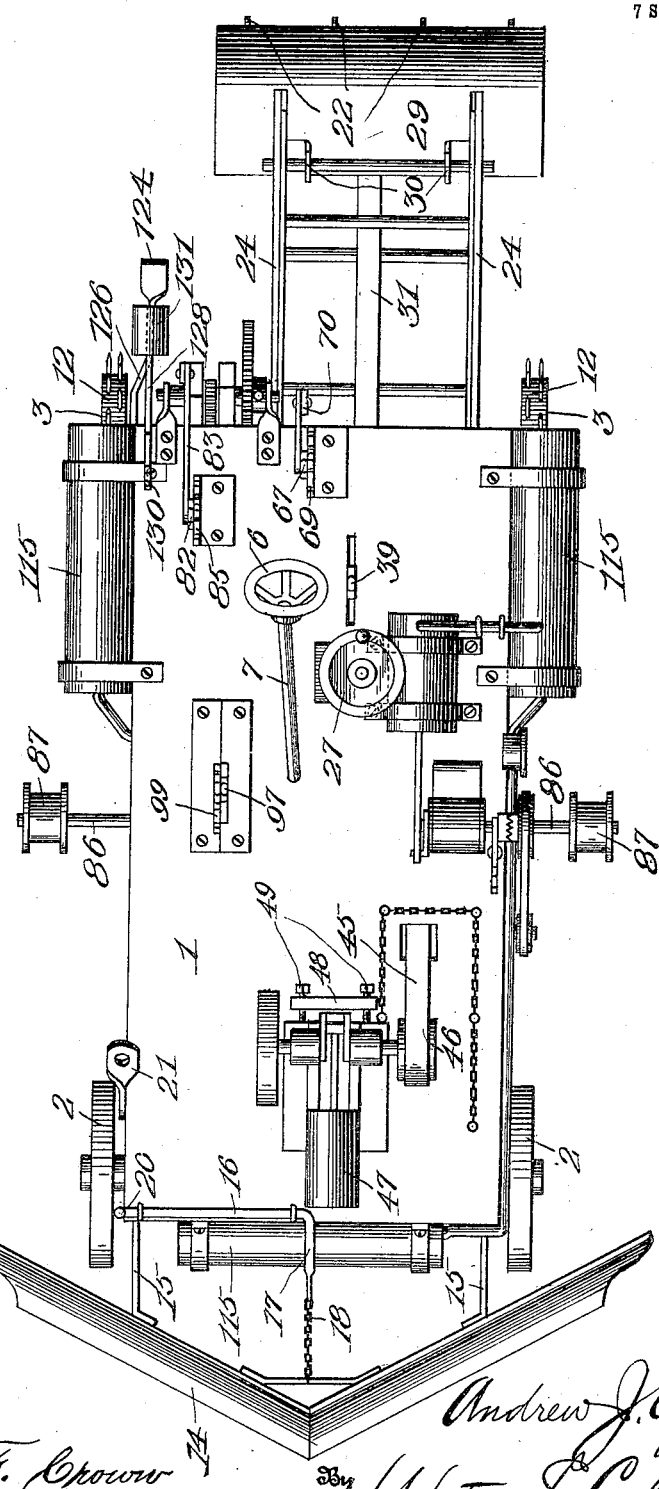
Figure 3:
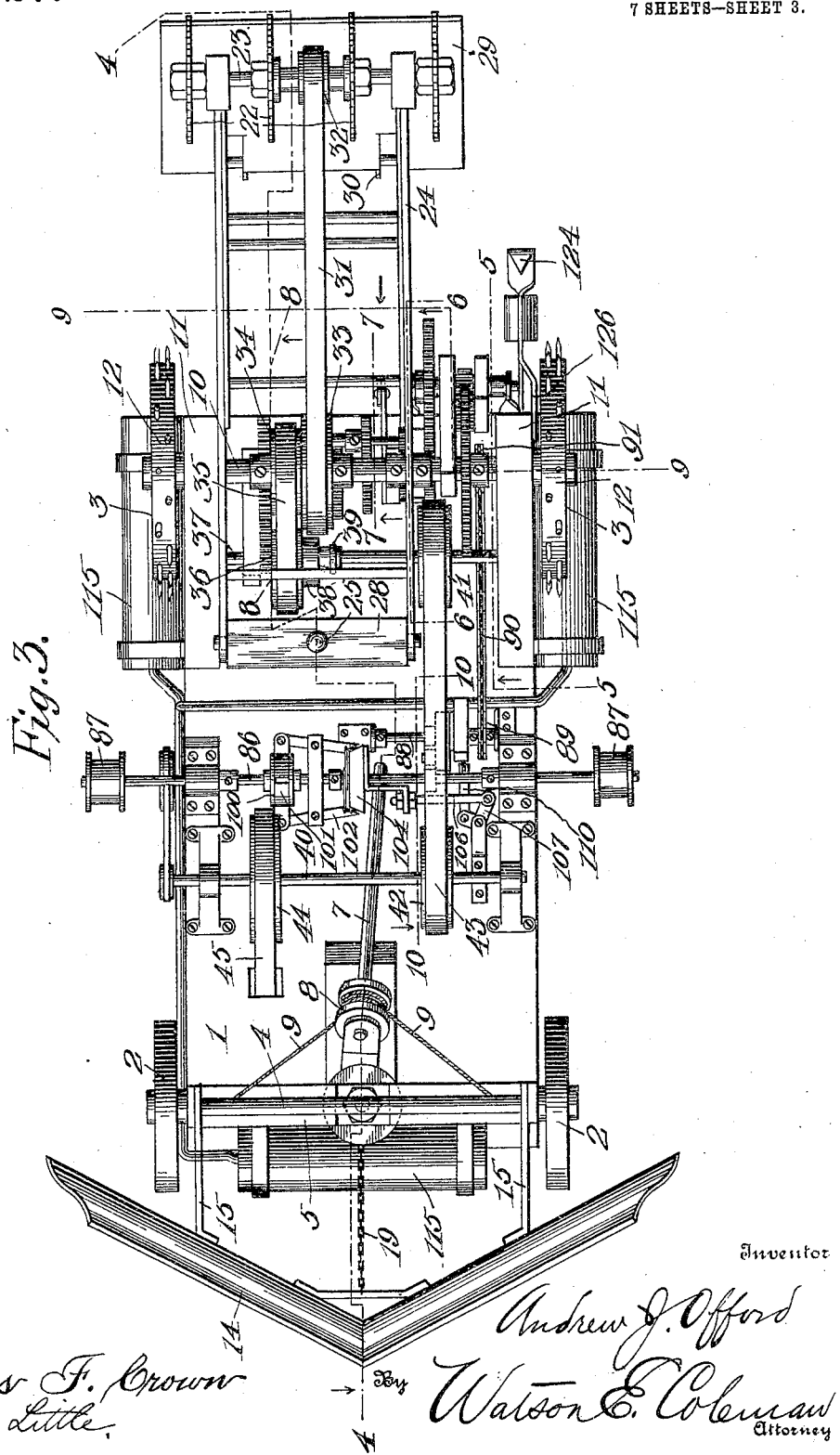
Figure 4:
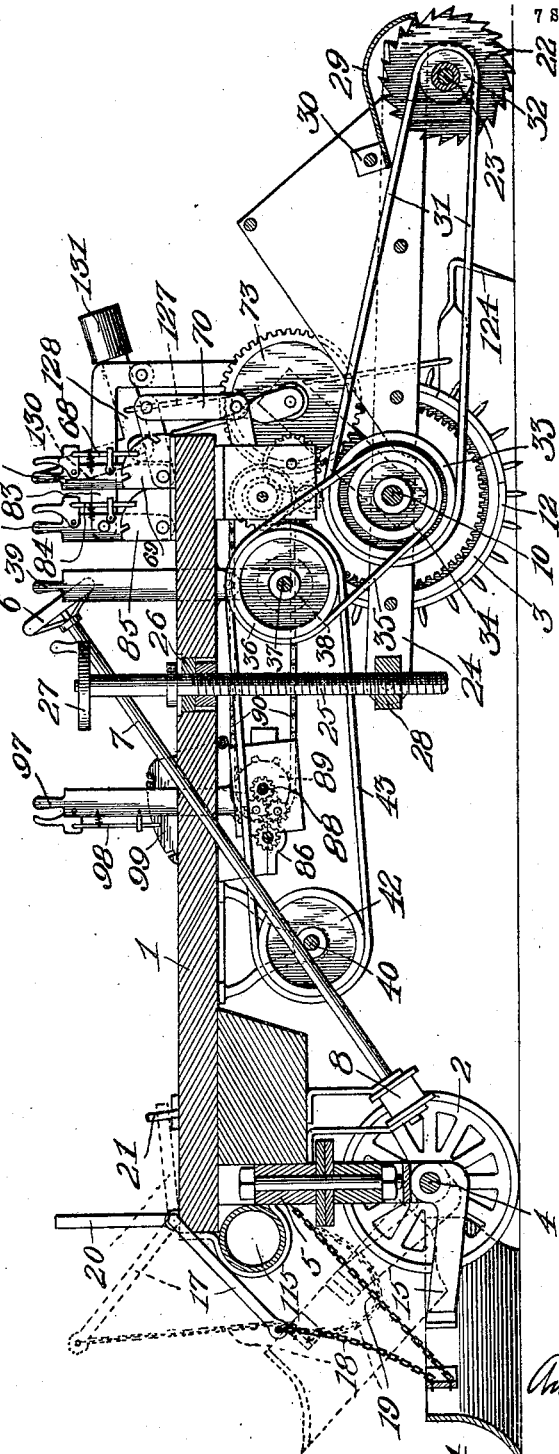
Figure 5:
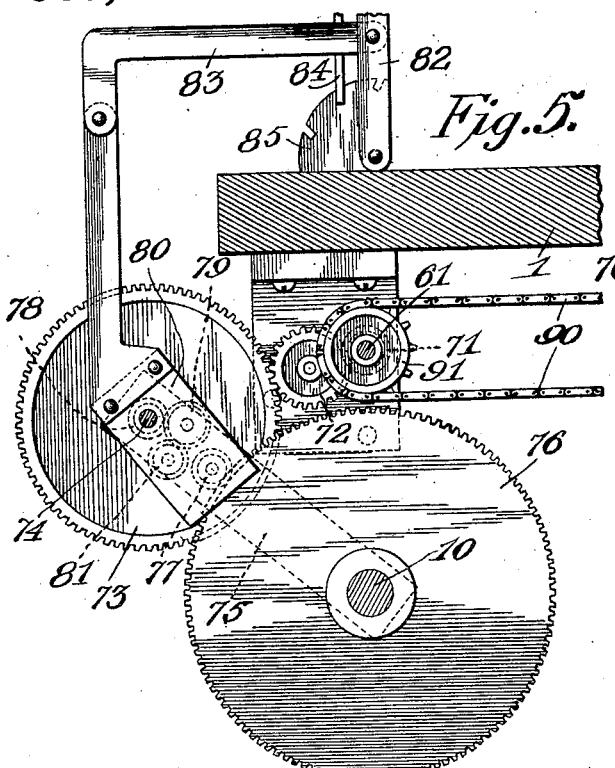
Figure 6:
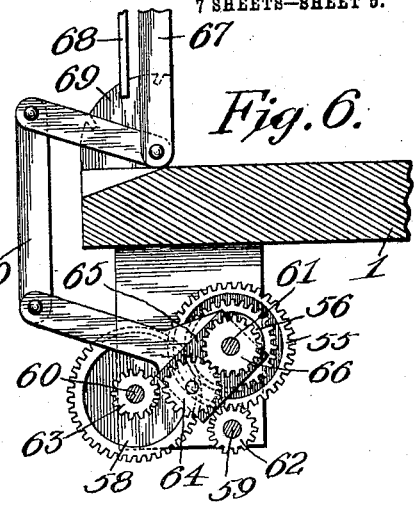
Figure 7:
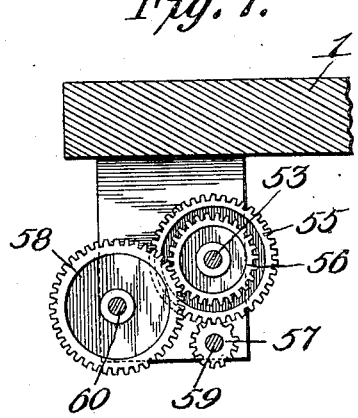
Figure 8:
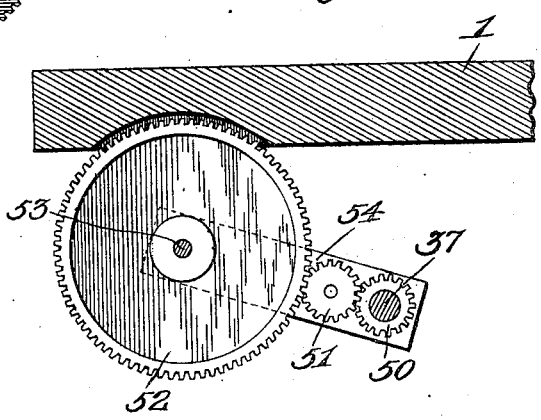

Figure 1 is a side elevation of my improved ice cutting and handling machine; Fig. 2 is a top plan view; Fig. 3 is a bottom plan view; Fig. 4 is a vertical longitudinal section taken on the plane indicated by the line 4—4 in Fig. 3; Figs. 5, 6, 7 and 8 are detail sectional views taken respectively on the planes indicated by the lines 5—5, 6—6, 7—7 and 8—8 in Fig. 3 and showing the reversing variable speed gearing; Fig. 9 is a vertical transverse section taken on the plane indicated by the line 9—9 in Fig. 3; and Figs. 10, 11 and 12 are detail views of the hoisting mechanism.

In the drawings 1 denotes the body or platform of my improved machine which is supported by front steering wheels 2 and rear driving wheels 3. The front wheels are journaled upon an axle 4 having its bolster 5 pivoted by a king bolt to a bolster at the front of the platform, as illustrated, or in any other suitable manner. The machine is preferably steered by turning a hand wheel 6 upon the upper end of a downwardly and forwardly inclined shaft 7 journaled in suitable bearings and provided with a drum 8 having the inner ends of cables 9 connected to and wound upon it in opposite directions, the other ends of said cables being connected to the bolster 5 so that when the hand wheel 6 is rotated the front axle will be oscillated to steer the machine. The rear wheels 3 are fixed to the ends of the rear axle 10 which is journaled in bearings in suitable brackets or hangers 11 depending from the platform at its rear end.

The rear wheels 3 are driven by a motor as presently explained and in order to prevent them from slipping upon the ice I provide them with spiked rims 12 which are made detachable so that the machine may be used upon a road or street without injury to the same. Said spiked rims are made in a plurality of arc-shaped sections each of which is detachably secured to the rim or felly of the wheel by bolts or similar removable fastenings 13.

For the purpose of clearing snow from the ice I provide at the front of the machine a V-shaped shovel or plow 14 and pivotally suspend the same so that it may be raised to an inoperative position when not needed. Said shovel is pivotally mounted by providing its diverging branches with hanger arms 15 which are apertured to receive the axle and are adapted to swing thereon. The shovel is adapted to be elevated by means of a rock shaft 16 suitably journaled upon the front portion of the frame and having at its inner end a crank arm 17 projecting forwardly from the center of the platform 1 and connected at its outer end by a chain 18 to a cross brace uniting the branches of the shovel. A chain 19 is also provided to limit the downward movement of the shovel, said chain being connected at one end to the chain 18 and at its other end to the platform or body of the machine. The other end of the rock shaft 16 is provided with a crank handle 20 adapted to be secured by a pivoted catch 21 when it is desired to hold the shovel in its elevated position.

The ice cutting saws 22 are arranged at the rear of the machine and any number of them may be suitably secured upon a transverse arbor 23 journaled in suitable bearings at the outer end of a longitudinally disposed saw carrying and adjusting frame 24. The latter has side bars united and spaced apart by cross bars and it is pivotally mounted upon the rear axle 10 by providing its side bars with apertures intermediate its ends to receive said axle. Said frame is adapted to be oscillated to raise or lower the saws according to the thickness of the ice to be cut, by a vertically disposed screw 25 having its upper portion swiveled at 26 in the platform and provided with a hand wheel 27, and its lower screw threaded end projecting through a threaded opening in a cross bar 28 swiveled in the frame 24 by providing the inner forward ends of the side bars of said frame with bearing openings to receive pivot studs formed on the ends of the bar 28.

29 denotes a curved guard for the saws which is disposed transversely and pivoted at its inner or forward edge, to a cross bar or rod arranged in upright plates suitably secured to the side bars of the frame 24. The pivotal connection of the guard plate is effected by cutting the inner edge of said plate and bending the cut portions upwardly to provide the pivot ears 30 which are apertured to receive said cross bar or rod connecting the side bars of the frame 24. The guard may be swung upwardly and supported against said plates when it is desired to have access to the saws.

The saw arbor is driven by a belt 31 passed around a small pulley 32 on said arbor and around a large pulley 33 loosely mounted upon the rear axle 10 and rigidly secured to a small pulley 34, which latter is in turn connected by a belt 35 to a pulley 36 loosely mounted on a secondary countershaft 37 journaled in suitable bearings depending from the bottom of the platform 1. In order to permit the saws to be started or stopped without affecting the other parts of the machine, hereinafter explained, I connect the pulley 36 to the shaft 37 by a friction clutch 38 or any equivalent device which may be controlled by a lever 39 extending through the platform and within convenient reach of the operator of the machine.

The secondary countershaft 37 is driven from a primary countershaft 40 disposed transversely beneath the platform and journaled in suitable bearings depending therefrom. Said countershafts are provided with pulleys 41, 42 which are connected by a belt 43. The primary countershaft 40 is provided with a pulley 44 which is connected by a belt 45 to a driving pulley 46 on the shaft of a gasolene engine 47 or a motor of any other suitable form and construction. Said motor is conventionally illustrated and its base is arranged in guides 48 and adapted to be adjusted by screws 49 so that the main drive belt 45 may be tightened or loosened without changing its length. Said belt 45 extends through suitable openings in the platform and a suitable guard rail may be provided on the platform around the upper portion of said belt.

The rear axle is driven in either a forward or rearward direction and its speed varied by mechanism which I will now describe. Fixed to the secondary countershaft 37 is a gear 50 which meshes with a gear 51, which latter in turn meshes with a gear 52 fixed upon a transverse shaft 53 journaled in suitable bearing brackets or hangers depending from the bottom of the platform 1. The gear 51 is journaled on a stub shaft carried by a bar 54 arranged between the shafts 37, 53. Owing to the difference in size between the gear 51 and gear 52 it will be seen that the speed of the shaft 53 will be less than that of the shaft 37. Fixed upon the shaft 53 are large and small gears 55, 56 which mesh, respectively, with a small gear 57 and a large gear 58. The shafts 59, 60 of the gears 57, 58, respectively, are journaled in suitable bearings and are disposed adjacent to a shaft 61 suitably journaled and preferably disposed in longitudinal alinement with the transverse shaft 53. Also fixed upon the transverse shafts 59, 60 are gears 62, 63 either one of which is adapted to be engaged by a gear 64 journaled on a stub shaft carried by a swinging plate or member 65 which is pivoted upon the shaft 61. It will be seen that when the plate 65 is swung in one direction the gear 64 will mesh with the gear 62 and the motion of the shaft 53 will be imparted to the shaft 61 through the gears 55, 57, 62, 64 and a gear 66 fixed to said shaft 61 and always in mesh with the gear 64; and that when the plate 65 is swung in the opposite direction so that its gear 64 meshes with the gear 63 the motion of the shaft 53 will be imparted to the shaft 61 through the gears 56, 58, 63, 64 and 66.

Owing to the difference in sizes of the gears 55, 57, 56, 58, it will be seen that the shaft 61 may be driven at either of two speeds. The gear 64 is also preferably so disposed that when the plate 65 is in an intermediate position it is out of mesh with both of the gears 62, 63. It will be seen that the gearing just described provides an exceedingly simple and practical variable speed driving connection between the motor and the drive wheels of the machine, the low speed being employed for sawing ice and for towing a train of sleds or vehicles loaded with ice while the high speed is used for quickly propelling the machine when it has little or no load in going to and from the place where the ice is to be cut. The gearing just described is exceedingly compact and permits the machine to be thrown out of gear and stopped without stopping the engine and further enables it to be effectively used for traction purposes as well as for sawing ice. Said plate or member 65 is preferably operated and secured in an adjusted position by a lever 67 in the form of a bell crank carrying a spring projected and hand retracted pawl 68 adapted to engage one of three notches formed in a segmental locking or ratchet plate 69. The short arm of the lever is connected by a link 70 to an arm projecting from the plate or member 65. It will be seen that when the pawl 68 is engaged with the central notch in the locking plate 69 the gear 64 will be out of mesh with both of the gears 62, 63, that when said pawl engages one of the side notches in the plate 69 the gear 64 will mesh with the gear 62 and drive the shaft 61 at one speed, and when said pawl is in the other side notch said gear 64 will mesh with the gear 63 and the shaft 61 will be driven at a different speed.

Fixed to the shaft 61 is a gear 71 which meshes with a gear 72, which latter in turn meshes with a gear 73 fixed upon a transverse shaft 74 journaled in suitable depending bearing brackets or hangers and connected by a bar or plate 75 to the axle 10. Fixed to the latter is a gear 76 which meshes with a gear 77 on a stub shaft on the connecting bar 75. Fixed to the shaft 74 is a gear 78 which meshes with a gear 79 journaled on a stub shaft on a swinging plate or member 80 which is pivoted on the shaft 74, and which also carries a stub shaft for a gear 81 which meshes with the gear 79. The gears 79, 81 are so disposed that when the plate 80 is swung in one direction the gear 81 will mesh with the gear 79 and the motion of the shaft 74 will be imparted by the gears 78, 79, 81, 77, 76, to the shaft 10 to drive the machine in a forward direction; and when said plate 80 is swung in the opposite direction the gear 79 will mesh with the gear 77 and the motion of the shaft 74 will be imparted through the gears 78, 79, 77, 76, to the axle 10 to move the machine in a rearward direction. When said plate 80 is in an intermediate position neither of the gears 79, 81 mesh with the gear 77 and consequently the machine will remain quiet. I preferably actuate and adjust the plate or member 80 by means of a lever 82 which is connected by a link 83 to an upwardly projecting arm upon said plate or member. The lever 82 carries a spring projected and hand retracted pawl 84 adapted to engage either one of three notches formed in a locking or ratchet plate 85. When the lever is in its intermediate position the gears 79, 81 will be out of mesh with the gear 77 and when swung rearwardly the gear 81 will mesh with the gear 77 so that the machine will be propelled forwardly and when said lever is swung in a forward direction the gear 79 will mesh with the gear 77 and the machine will be propelled in a rearward direction.

It will be noted that the reversing gear just described is exceedingly simple and compact in construction and that it enables the machine to be quickly and easily reversed. This gear, in connection with the variable speed gear above described, enables the machine to be effectively controlled and used for traction purposes as well as for cutting ice.

In order to permit the machine to be used for dragging the blocks of ice out of the river, pond, or lake, for hoisting them up upon a wagon, sled, or other vehicle or hoisting them into a storage house or for analogous purposes, I provide a transverse shaft 86 and provide upon its projecting ends winding drums 87. Said shaft is disposed transversely beneath the platform and journaled in suitable bearing brackets or hangers and it is driven from a countershaft 88 journaled in suitable bearings and provided with a sprocket 89 which is connected by a chain 90 to a sprocket 91 upon the shaft 61. Fixed to the shaft 88 is a gear 92 which meshes with a gear 93 journaled on a stub shaft on a plate or member 94 pivoted on the shaft 88 and also carrying a stub shaft on which is journaled a gear 95 which meshes with the gear 93. Fixed on the shaft 86 is a gear 96 which may be engaged by either of the gears 93, 95, the latter being so disposed that when the plate 94 is swung in one direction the gears 95, 96 will mesh and the shaft 86 will be rotated in one direction, and when said plate 94 is swung in the opposite direction the gears 93, 96 will mesh and the shaft 86 will be rotated in the opposite direction. When the plate 94 is in an intermediate position neither of the gears 93, 95 will mesh with the gear 96 so that the motion of the shaft 88 will not be imparted to the hoisting drum shaft 86. The plate or member 94 is adapted to be actuated and held in an adjusted position by means of a lever 97 which has its lower end fixed to said plate or member and its upper portion projecting through an opening in the platform and provided with a spring projected and hand retracted pawl 98 adapted to engage notches in a segmental locking plate 99. The latter is provided with three notches to secure the lever in its three positions to throw the shaft 86 out of gear, or to connect it to the shaft 86 so that it will be driven in either direction.

In connection with the reversing gear just described I preferably provide an automatic braking device for the winding drum shaft 86. This device comprises a flanged friction wheel 100 fixed to the shaft 86 and adapted to be engaged by leather faced semi-circular brake shoes 101 pivoted upon the ends of levers 102 which are pivoted intermediate their ends at 103 and have their other ends beveled to engage the opposite ends of a wedge-shaped spreader 104 which is slidably mounted on the shaft 86. A spring 102$^a$ connects the beveled ends of the levers 102 to draw them together and move the brake shoes out of engagement with the brake wheel. The spreader 104 is provided with a bracket 105 to which is adjustably connected a rod or link 106 having its opposite end pivoted to one arm of a bell crank 107. The adjustable connection between the rod 106 and the bracket arm 105 is effected by screw threading the end of the former and passing it through an opening in the latter and providing adjusting nuts on opposite sides of said bracket arm. The bell crank is pivoted at its angle at 108 upon a suitable bearing bracket and its other end is connected to a push rod 109 slidably mounted in a guide 110 depending from the platform 1. The free end of the guide is bifurcated to receive an anti-friction roller 111 which is journaled in said end and adapted to be engaged by the oppositely beveled V-shaped or rounded end 112 of a plate or member 113 fixed to the plate 94. Said end 112 of the plate 113 forms a cam which is adapted to actuate the push rod 109 when the lever 97 is adjusted. Upon reference to the drawings it will be noted that said cam 112 is so shaped that when the lever is in its intermediate position the point or highest point in the cam will move the push rod 109 to the limit of its forward movement and thereby cause the bell crank 107 to move the rod 106 and the spreader 104 toward the brake wheel and thereby cause said levers to move the brake shoes into frictional engagement with said wheel to stop the rotation of the shaft 86; and that when the lever 97 is in either of its other two positions the cam 112 will allow the push rod to be moved rearwardly under the action of the spring 102$^a$, which latter also causes the brake shoes to release the brake wheel or disk. It will be seen therefore that the brake device will be automatically operated as the lever is shifted to reverse the direction of the winding drum shaft 86.

For the purpose of preventing the machine from sinking should the ice break or should it run off of the ice into the river, lake, or pond, I provide at suitable points upon it floats 115. As shown, three floats are provided, one being upon each side of the platform 1 at its rear and the other being at its front end.

124 denotes a marker for marking a line upon the ice as the machine travels forwardly, to serve as a guide for the operator when the machine makes its return trip. Said marker is disposed to one side of the rear portion of the machine and is spaced the same distance from the endmost saw as the several saws are spaced from each other. It is in the form of a lever having one end shaped to provide a downwardly projecting marking point and its other end pivoted at 125 to a bracket arm 126 depending from the platform or other suitable portion of the machine. Said marker arm or lever is raised and lowered by means of a link 127 which is pivoted at its lower end to said marking arm or lever and at its upper end to a bell crank lever 128 pivoted at its angle upon the top of the rear portion of the platform. One arm of said bell crank 128 is shaped to provide a handle 130 and its other arm to which said link is pivoted is provided with a weight 131. When the marker is lowered to an operative position it is pressed downwardly by the weight 131 and when it is desired to retract the marker and hold it retracted the handle 130 is grasped and swung downwardly to swing the weighted arm upwardly and forwardly over the center of the pivot of the bell crank to thereby elevate the marker and hold it elevated, as will be readily understood.

In operation, it will be seen that when the motor is started its movement may be transmitted through the gearing above described to the rear wheels so that the machine will be propelled forwardly and at either one of two speeds according to the adjustment of the lever 67. The driving gears may be thrown out of operation by adjusting said lever to its central position and by operating the lever 82 the machine may be caused to travel either forwardly or rearwardly at either of its two speeds according to the adjustment of the lever 67. The motion of the motor will also be imparted to the saws which will cut through the ice as the machine moves forwardly. By operating the screw 25 the saw carrying frame may be adjusted angularly to raise or lower the saws according to the thickness of the ice being cut. When it is desired to use the machine for elevating or hoisting the ice, suitable hoisting cables may be attached to the winding drums, which may be started, stopped and caused to turn in either direction by adjusting the lever 97. The provision of this hoisting mechanism with its automatic brake and reversing features greatly increases the usefulness of the machine. The latter may also be used for transporting a train of sleds or other vehicles loaded with ice, etc.

I preferably employ the low speed for sawing and for towing a train of sleds or vehicles loaded with ice, and the high speed for quick return when it is desired to saw in one direction and for traveling purposes in going to and from the camp or storage house and the place of sawing.

While I have shown and described in detail the preferred embodiment of my invention I wish it understood that I do not limit myself to the precise construction set forth and that various changes in the form, proportion and minor details may be resorted to without departing from the spirit or sacrificing any of the advantages of the invention.

Having thus described my invention what I claim is:

1. In a machine of the character described, the combination of a body, driving wheels, an axle for the latter, ice sawing mechanism having cutters, means for raising and lowering said cutters, a motor, means for driving the ice sawing mechanism from said motor, the shaft 53 driven by said motor, large and small gears on said shaft 53, the shaft 60 having a large gear to mesh with the small one on the shaft 53, the shaft 59 having a small gear to mesh with the large one on the shaft 53, the shaft 61 geared to the axle, the gear 66 on the shaft 61, a plate pivoted at one end on the shaft 61 and having a projecting arm, a gear upon said plate to mesh with said gear 66 and to be moved into operative connection with either of said large and small gears on the shaft 53, a lever, a connection between the latter and said arm, a locking pawl carried by the lever and a segmental locking rack having three notches to receive the pawl, whereby the gear on said plate may be held in operative connection with either of said large and small gears on the shaft 53 or out of operative connection with the same.

2. In a machine of the character described, the combination of a body, driving wheels, an axle for the latter, ice sawing mechanism having cutters, means for raising and lowering said cutters, a motor, means for driving the ice sawing mechanism from said motor, the shaft 53 driven by said motor, large and small gears on said shaft 53, the shaft 60 having a large gear to mesh with the small one on the shaft 53, the shaft 59 having a small gear to mesh with the large one on the shaft 53, the shaft 61, gearing between the shaft 61 and the axle, a reversing mechanism included in the last mentioned gearing, the gear 66 on the shaft 61, a plate pivoted at one end on the shaft 61 and having a projecting arm, a gear upon said plate to mesh with said gear 66 and to be moved into operative connection with either of said large and small gears on the shaft 53, a lever, a connection between the latter and said arm, a locking pawl carried by the lever and a segmental locking rack having three notches to receive the pawl, whereby the gear on said plate may be held in operative connection with either of said large and small gears on the shaft 53 or out of operative connection with the same.

3. In a machine of the character described, the combination of a body having a platform, a rear axle, driving wheels fixed to the latter, a front axle, steering wheels upon the latter, a saw carrying frame pivoted intermediate its ends on the rear axle, a vertical screw for adjusting the front end of said frame, a saw arbor journaled in the rear end of the frame, saws upon said arbor, a motor upon the platform, the countershaft 37 driven from said motor, a double pulley loose on the rear axle, pulleys upon the countershaft and the saw arbor, belts connecting the last mentioned pulleys to said double pulley, a clutch connection between the countershaft and the pulley thereon, the shaft 53 driven from the countershaft 37, the shaft 61, variable speed gearing between the shaft 53 and the shaft 61 and a reversing gear between the shaft 61 and the rear axle.

4. In a machine of the character described, the combination of a body, driving wheels, an axle for the latter, a motor upon the body, the countershaft 37 driven from said motor, an ice cutting mechanism, means for driving the same from said countershaft, the shaft 53 driven from said countershaft, the shaft 61, variable speed gearing between the shaft 53 and the shaft 61, and a reversing gear between the shaft 61 and said axle.

5. In a machine of the character described, the combination of a body, a vertically swinging saw carrying frame pivotally mounted beneath the body, said frame having rearwardly extending side bars, upright plates upon said side bars, means for raising and lowering said frame, a saw arbor journaled upon the rear end of the frame, saws upon said arbor, a transverse pivot rod uniting the upright plates on the side bars of the frame, and a curved guard plate disposed over the saws and having its front edge cut and bent to provide upwardly projecting pivot ears which receive said pivot rod, whereby the guard plate is pivotally mounted on the swinging frame for vertical movement therewith and whereby said guard plate may be thrown in a forward direction past the vertical plane of its pivot to rest upon the edges of the side plates on the bars of the frame, substantially as and for the purpose set forth.

6. In a machine of the character described, the combination of a body carrying ice sawing mechanism, a pivoted front axle, steering wheels upon the latter, a V-shaped snow shovel, arms fixed to and projecting rearwardly from the shovel and pivoted on the axle, whereby said shovel may swing vertically independent of the axle and also laterally or horizontally with the axle, a flexible connection between the body and the shovel to limit the downward swinging movement of the latter, a transverse rock shaft journaled upon the front end of the body and having at one end an arm to provide a hand lever and at its other end a forwardly projecting arm disposed at the center of the front end of the body, a flexible connection between the last mentioned arm and the shovel and a catch pivoted upon the body for engagement with the first mentioned arm or hand lever on the rock shaft, whereby the shovel will be held elevated, the pivotal mounting of the shovel and its flexible connection with the forwardly projecting arm on the rock shaft permitting it to swing with the axle when the latter is moved to steer the machine.

7. In a machine of the character described, the combination of a body carrying an ice cutting mechanism, a bracket upon the body, a rearwardly and longitudinally extending marker arm pivoted to the bracket and having its rear end bent to provide a downwardly projecting marking point, a bell crank pivoted at its angle upon the rear portion of the body and having a rearwardly projecting arm disposed over the marker arm and an upwardly projecting arm forming a hand lever, a weight upon the extremity of the rearwardly projecting arm of the bell crank, and a link pivoted at its upper end to the intermediate portion of the rearwardly projecting arm of the bell crank and having its lower end pivoted intermediate the ends of the marker arm, whereby the weight will actuate the marker arm downwardly, the mounting of the bell crank permitting the rearwardly extending weighted arm of the bell crank to be swung forwardly over the vertical plane of the pivot of the bell crank, whereby the marker arm will be held elevated.

In testimony whereof I hereunto affix my signature in the presence of two witnesses.

ANDREW J. OFFORD.

Witnesses:
 WM. R. SULLIVAN,
 GEO. CRANE.